May 31, 1932. B. GERNHARDT 1,861,307
APPARATUS FOR THE AUTOMATIC PRODUCTION OF INSPISSATED SUGAR FRUITS
Filed Aug. 29, 1927
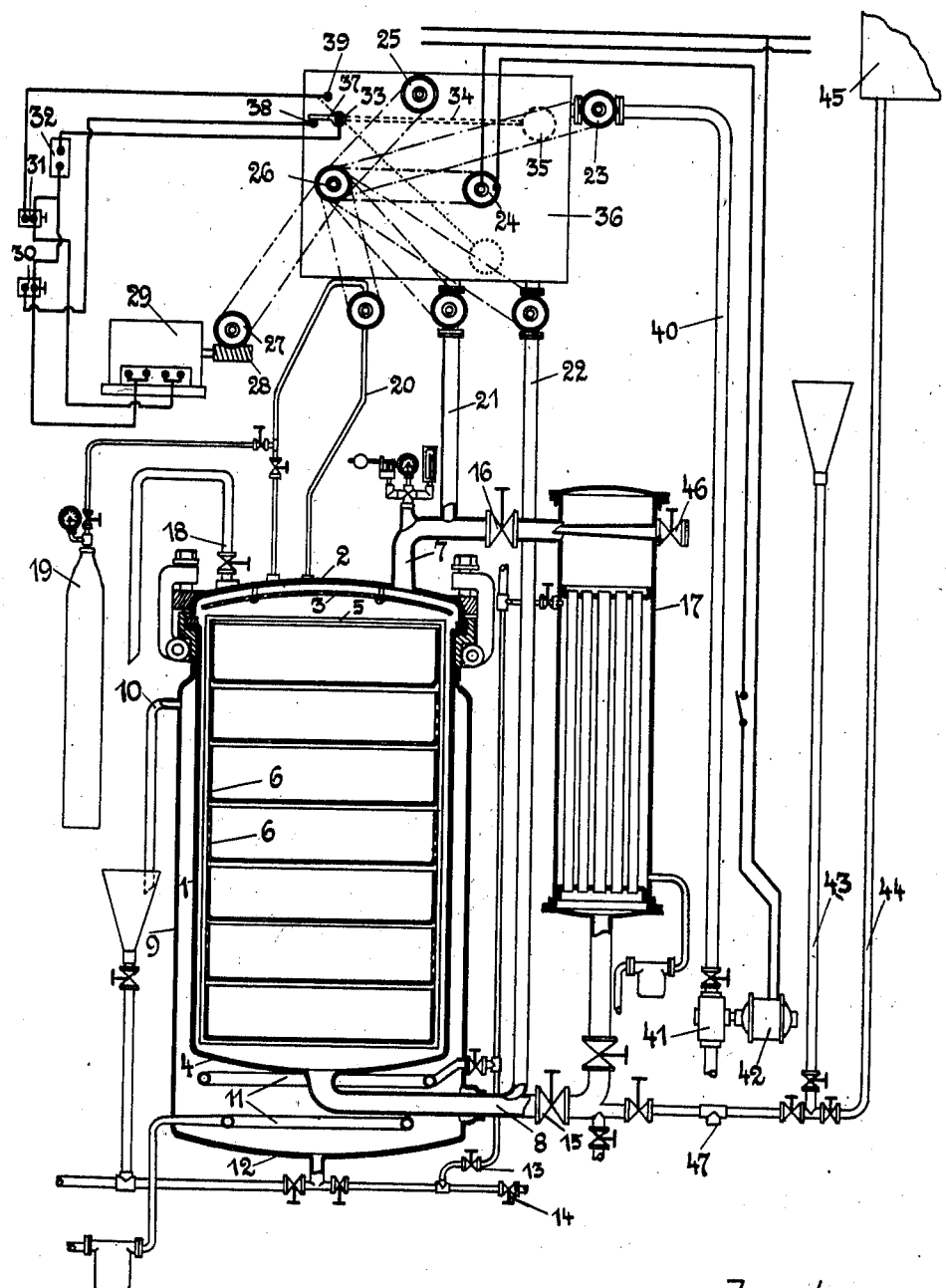
Inventor:
Berthold Gernhardt Patented May 31, 1932

1,861,307

UNITED STATES PATENT OFFICE

BERTHOLD GERNHARDT, OF BERLIN, GERMANY

APPARATUS FOR THE AUTOMATIC PRODUCTION OF INSPISSATED SUGAR FRUITS

Application filed August 29, 1927, Serial No. 216,311, and in Germany July 25, 1927.

This invention relates to the production of inspissated sugar fruits and has for its object to provide an improved apparatus for the preparation of these products.

It has been proposed heretofore to preserve fruit in sugar by preliminarily washing and then digesting the fruit in steam and thereafter treating it with successive charges of strong syrup under high pressure and desiccating it.

The present invention consists in placing the fruit in a closed vessel, stewing the fruit therein with water and then treating it in the same vessel under high pressure of carbon dioxide with a sugar solution containing 66% of sugar and produced by dissolving sugar in cold water.

An apparatus according to this invention is shown in the only figure of the accompanying drawing.

Referring to the drawing 1 designates a treatment vessel, preferably of copper and adapted to be airtightly closed like an autoclave by a removable lid 2 by means of hinge-screws and packing-rings. A perforated disk 3 fixed on the inner surface of the lid 2 serves as cover for the uppermost basket-shaped sieve 6. A pipe 8 starting from the lowest point of the bottom-plate 4 is connected by a pipe 22 with a vessel 36 and communicates through a valve 15 with a counter-current preliminary-heater 17. The several basket-shaped sieves 6, the height of which depends on the size of the fruits, are inserted in a frame 5 so that, by means of this frame, they can be inserted into and removed from the boiler 1. In the lid 2 ends a pipe 7, which by a tube 21 is connected to a vessel 36 and communicates through a valve 16 with the preliminary-heater 17. The pipe 7 carries on a tubular extension a manometer, a safety valve and a thermometer. The lid 2 has further an overflow 18 with shutting-off element and connecting tubes leading to a carbon-dioxide-bottle 19.

The treatment vessel is enclosed by an outer vessel 9, having an open over-flow 10 and a steam heating coil 11; at the lowest point of the bottom 12 of the outer vessel 9 a discharge is arranged through which, when a valve 13 is open, steam and when a valve 14 is open, cold water can be forced into the space between the inner vessel and the outer vessel. This arrangement serves for regulating the temperature in the vessel 1.

The preliminary heater 17 is steam heated. The steam enters through the valve 17a, flows around the heating tubes and flows out through the pipe. The water enters from below into the tubes and after having been heated, it flows out at the upper ends of the heating tubes through the dome. On the side of the preliminary heater 17, opposite the connecting pipe 7, a valve 46 is arranged which has a horizontal nozzle traversing the preliminary-heater 17. The object of this arrangement will be hereinafter described.

The boiler 1 communicates with the airtightly closed vessel 36 arranged above the treatment vessel by tubes 21 and 22 which comprise each a shutting-off element. In the vessel 36 a float 35, mounted on a horizontal rod 34, is pivotably mounted on an axle 33 and controlled by the liquid-vessel in the vessel 36. On the outer end of axle 33, projecting from the wall of the vessel 36, a contact-lever 37 is mounted which, according to the position of the float, engages with the contacts 38 and 39. In the suction-pipe 40 leading to an air-pump 41 a shutting-off element 23 is arranged, and an air-valve 25 and a reversing device 24 are provided for the driving motor 42 of the air-pump. A control-device 26 consists of a sprocket-wheel from which the elements 20, 21, 22, 23, 24 and 25 are controlled in a convenient manner by means of chains and brought either into the closing or opening position. The sprocket-wheel 26 is driven by a chain from an intermediate gearing 27 which is operated from the motor 29 by a worm 28. The motor 29 is connected to a power-current-switch 30 and a switch for weak current 31, said switches being connected to the float-contacts 33, 38 and 39 and to a time-switch 32. The switching-motor 29, acting upon the worm-wheel-transmission, is an electro-motor of required size and kind of current. When the shutting-off elements 20, 21, 22, 23, 24 and 25 consist of cocks, capable to turn 90°, a lever-transmission may be substituted for the chain and sprocket-wheel-transmission. In this case the counter-shaft of the switch-motor has a crank to which a connecting rod is connected which is brought into according co-operation with the control-levers of the shutting-off elements. A sliding clutch between the worm and the crank serves for accurately limiting the switch-movement.

Fresh water or sugar-solution is supplied to the treatment vessel 1 through a pipe 43 having a funnel at its top-end. 45 indicates a vessel situated on a higher plane than the vessel 1 and in which the sugar-solution with a percentage of sugar of 66% is prepared by cold process according to the diffusion-method, this sugar-solution being supplied through the pipe 44 to the vessel 1 from below. In the pipe 44 a branch-tube 47 is arranged the object of which together with that of the preliminary-heater valve 46 will be hereinafter explained.

The vessel 1 may be horizontal and in this case the frame for the basket-shaped sieves are mounted on wheels and run on rails in the boiler and in front of the same.

Carrying out of the process by means of the above described plant:

The basket-shaped sieves 6 in which fruits are located loosely side by side, are placed in the frame 5 and inserted into the vessel 1 which is then airtightly closed. Cold water is then filled into the vessels 14, 17 through the funnel-pipe 43 until the water flows out through the open over-flow pipe 18, whereupon all the valves, except the valves 15, 16 and 18 are closed and steam is admitted into the preliminary-heater 17. As the preliminary-heater 17 has been filled with water at the same time as the vessel 1, a water-circulation will be started owing to the heating of the water in the preliminary-heater. When the thermometer indicates the desired constant temperature for the treatment of the fruits, the steam admission to the preliminary-heater is shut off.

For maintaining the temperature with fruits, the aroma of which is difficult to deal with, below the destroying limit and for regulating said temperature either water slightly heated by the heating-coil 11 or cold water is admitted into the outer vessel 9.

When the stewing treatment is terminated, fresh water is supplied into the vessel 1 until all candifying water has flown out through the overflow 18. The fruits are then not heated again. The sugar-solution to be used, is not boiled but produced by cold process to a strength of 66% of sugar and supplied to the boiler 1 from below from the solution-vessel 45 through the pipe 44. The sugar-solution of higher specific gravity displaces the water from the vessel 1 so that it flows out through the overflow 18. As soon as the sugar-solution has reached the overflow 18 the sugar-admission is shut off and also the overflow 18. From the carbon-dioxide-bottle 19 suitable pressure is supplied to the vessel 1, this pressure varying according to the kind of the fruits between 0,5 and 10 atms. By the pressure an intensive-diffusion of the sugar-solution possessing higher specific gravity takes place into the fruits, the amniotic-liquor possessing lighter specific gravity being removed from the fruits. As the thick sugar precipitates from the solution onto the bottom-plate of the vessel 1, the sugar-solution must be caused to circulate from time to time to re-establish a uniform consistence, this being carried out preferably automatically owing to the reciprocal action of the elements which co-operate for this purpose. With not inverted sugar-solution a vacuum is produced for this purpose.

The time-switch 32 is first adjusted to the time-interval after which the circulation has to take place. The vessel 36 is empty and the float 35 is in its lowest position, so that through the intermediary of the time-switch by lever 37 and contact 39 a source of feeble current is switched in, which operates, through the intermediary of the reversing switch for weak current and power-current, the switch 29 which, through the control-mechanism 26, closes the carbon-dioxide-supply through valve 20, tube 21 to the boiler, the air-valve 25 and the switch-contact 24, in opening at the same time the shutting-off element in the suction-pipe 22 and the valve 23 in the suction-pipe for the air-pump. By closing of the contact 24 the driving motor 42 of the air-pump 41 is started and the air-pump produces a vacuum in the vessel 36 so that, through the pipe 22, a certain quantity of thick sugar-solution is sucked which lifts the float 35 until the contact-lever 37 of the same bears against the contact 38, whereby another circuit is closed through switch 30 so that the air-pump is stopped by the switch 24. The suction-pipe 40 and the supply-pipe 22 are closed, and at the same time the air-valve 25 and the pipe 21 are opened. Air flows then into the vessel 36 through the valve 25, so that the vacuum is destroyed and the thick sugar-solution in vessel 36 flows back through pipe 21 into the boiler 1 until the float 35 has assumed again its lowest position, so that valve 21 is closed and the pressure-conduit 20 of the carbon-dioxide-bottle is opened. These proceedings are automatically repeated in accordance with the intervals for which the mechanisms have been regulated.

When the treatment of the fruits is terminated, the sugar-solution is allowed to flow out, the boiler 1 is opened and the fruits are removed. The sugar-solutions, which have been used can be used repeatedly for similar fruits so that the process is very favourable also as regards economy.

When invert sugar-solutions are used, the periodic pumping over of the same may be effected directly with the aid of a liquid pump of suitable construction, which has to be arranged so that its suction conduit is connected to the branch-tube 47 and its pressure-conduit to the valve 46 of the preliminary-heater. When other sugar-solutions are used, the periodic pumping over is effected by vacuum.

I claim:

An apparatus for the automatic production of inspissated sugar fruits comprising in combination, a treatment vessel for the fruits, airtight closure means therefor, and means for automatically and periodically supplying and withdrawing from said vessel the inspissated sugar deposited therein comprising a vacuum creating pump, means for periodically destroying said vacuum and means to return the liquid to the treatment vessel.

BERTHOLD GERNHARDT.